US005335854A

United States Patent [19]

[11] Patent Number: 5,335,854

Seitz et al.

[45] Date of Patent: Aug. 9, 1994

[54] ELECTRICALLY INSULATED PRESSURE FEED PAINT RESERVOIR

[75] Inventors: David M. Seitz, Temperance, Mich.; Michael D. Elbertson, Elm Grove, Wis.

[73] Assignee: Ransburg Corporation, Indianapolis, Ind.

[21] Appl. No.: 989,351

[22] Filed: Dec. 11, 1992

[51] Int. Cl.[5] .......................... A01G 25/09; B05B 9/03

[52] U.S. Cl. ............................ 239/146; 239/DIG. 14; 239/708; 239/127; 118/602; 118/621; 118/300; 118/506; 222/608; 222/318

[58] Field of Search ............... 118/621, 602, 693, 694; 239/690, 708, 146, 147; 361/228

[56] References Cited

U.S. PATENT DOCUMENTS 2,546,701 3/1951 Ransburg et al. ...................... 91/45
3,864,603 2/1975 Kozinski et al. .................... 317/9 R
3,929,286 12/1975 Hastings et al. ........................ 239/3
3,937,400 2/1976 Krause ............................ 239/708 X
3,940,065 2/1976 Ware et al. .......................... 239/146
4,085,892 4/1978 Dalton ............................... 239/707
4,496,294 1/1985 Frikker ............................... 417/393
5,199,650 4/1993 Ishibashi et al. ................ 361/228 X

FOREIGN PATENT DOCUMENTS 760371 6/1967 Canada .

*Primary Examiner*—David A. Simmons
*Assistant Examiner*—M. Curtis Mayes
*Attorney, Agent, or Firm*—MacMillan, Sobanski & Todd

[57] ABSTRACT

An electrically isolating pressure feed paint reservoir suitable for holding electrically conductive paint applied with an electrostatic spray gun. A paint container is located in an electrically insulated housing which is mounted on a dolly for portability. The housing also mounts a pneumatically operated paint pump for delivering pressurized paint to the spray gun. When a lid to the housing is removed the high voltage power source is turned off and any high voltage present in the housing is discharged through a resistor.

4 Claims, 7 Drawing Sheets

ELECTRICALLY INSULATED PRESSURE FEED PAINT RESERVOIR

TECHNICAL FIELD

The invention relates to pressure feed paint reservoirs and more particularly to an electrically insulated pressure feed paint reservoir suitable for holding an electrically conductive paint during application with an electrostatic applicator.

BACKGROUND ART

In commercial paint lines, paint is often applied with a hand held spray gun. For small jobs, the paint may be supplied from a suction feed paint cup attached to the gun. For larger jobs, the paint typically is supplied from a remote pressure feed pot or reservoir connected through a hose to the gun. The pressure feed paint pot typically is a container which holds a volume of paint and is pressurized with compressed air. Or, for large operations, a pump may be used to supply paint under pressure from a vented container. When the paint container is pressurized, it is made from metal to withstand the applied pressure without risk of bursting. A paint feed tube generally is mounted on the lid of both a suction feed container and a pressure feed container so that removal of the lid provides access to the interior of the container for cleaning or refilling. However, there is a tendency for paint to drip from the paint feed tube when the lid is removed from the containers. Further, air tends to enter the paint feed tube when it is lifted from paint in the container. A resulting bubble may flow to the spray gun which can adversely affect the quality of the applied finish.

To increase coating transfer efficiency in commercial applications, the atomized coating material frequently is electrostatically charged relative to workpieces being sprayed. The electrostatically charged atomized paint droplets are drawn from the gun to the workpiece by the electrostatic field, thereby producing a more complete coating and reducing the amount of coating material which is dispersed into the atmosphere. This reduces both material costs and potential environmental problems. A very high voltage is used to charge the atomized paint, typically between 60 and 100 or more kilovolts. Because of the high voltage, care must be taken to protect the equipment operator from electrical shock. When an electrically non-conductive paint is being applied, the shock risk is minimum since only the paint is charged as it is atomized at the gun nozzle.

In recent years, there has been increased use of water borne paints which release less potentially hazardous solvents into the environment. Water vapor is the primary solvent released into the atmosphere as water borne paints dry. However, water borne paints are electrically conductive and therefore difficult to apply with an electrostatic spray gun. When the paint is exposed to a high voltage at the gun, the entire volume of paint from the gun to the supply reservoir and any electrically conductive components in contact with the paint become charged. If the supply reservoir or any other location in the paint supply system comes into contact with an electrical ground, the electrostatic voltage will be discharged. Consequently, it is necessary either to provide a voltage block in the paint feed system or to electrically isolate the entire paint supply system from ground. In commercial operations, the conductive paint often is supplied to an electrostatic applicator from a paint pot placed on an electrically insulated stand. The pot and stand are then enclosed in a grounded protective cage. In order to open a door to the cage, a switch is actuated to turn off the high voltage and to ground the paint pot. Such an arrangement has a number of disadvantages. It is difficult and time consuming to fill the paint pot. Also, the cage requires a significant amount of floor space which may be at a premium and relatively long paint supply lines are needed. If the paint is supplied from a pressurized pot, an agitator may be required to maintain the paint suspension and the paint in the supply lines is not easily agitated. Recirculation through the paint line is not practical when a pressure pot is used. Further, the use of agitators with water borne paint has sometimes caused a foaming problem in the paint. Because of their high costs and lack of portability, existing voltage block and paint supply isolation systems have not been suitable for smaller businesses which, for example, may apply on the order of 30 to 50 gallons (114 to 189 liters) of paint per month. Consequently, smaller businesses often did not have the option of using water borne paints in an electrostatic application system.

DISCLOSURE OF INVENTION

The invention is directed to an electrically insulated pressure feed paint reservoir suitable for use with water borne and other electrically conductive paints applied with an electrostatic applicator. An electrically insulated housing enclosing a paint container is mounted on casters for mobility. An upper portion of the housing holds either the paint or a container for the paint. Preferably, the paint container is a standard sized container in which the paint is sold. A pneumatically operated diaphragm pump is mounted in a lower portion of the housing to supply a flow of paint under pressure. A valve and pressure regulator are mounted on the outside of the housing for control operation of the paint pump. Excess paint flow from the pump is returned through a metering valve to the container to provide continuous paint recirculation for stirring the paint without risk of producing foam. The returned paint may be discharged into the container from a tube or from a ring which surrounds an upper edge of the container for flowing the paint over the interior walls of the container. The continuous flow of paint over the interior container walls keeps fast drying paints from drying on the container walls.

A removable lid provides access to the upper housing portion for replenishing the paint. When the lid is removed, a pneumatic valve is actuated to interrupt the flow of atomization and pattern shaping air to the gun. The flow of atomization and pattern shaping air to the gun typically is required to close a pneumatic switch which turns on the electrostatic power supply. Consequently, the high voltage will be removed from the system whenever the reservoir lid is opened. A large value resistor is mounted in the housing for discharging the paint and other electrostatically charged components in the housing when the high voltage is interrupted. A grounded needle or a grounded gasket may be mounted on the lid to eliminate the risk of high voltage leakage or corona discharge between the reservoir housing and the lid.

Optionally, a support for a paint container in the upper housing portion may be mounted on a spring platform. The displacement of the platform will depend on the amount of paint in the container. When the container becomes empty, a pneumatic switch may be actuated by the raising platform. This switch may interrupt spraying, or it may operate an alarm to notify the system operator that paint is running low, or it may operate a valve to automatically refill the paint container.

Accordingly, it is an object of the invention to provide an improved paint reservoir for supplying a pressurized flow of electrically conductive paint to an electrostatic applicator.

Other objects and advantages of the invention will become apparent from the following detailed description of the invention and the accompanying drawings.

BEST MODE FOR CARRYING OUT THE INVENTION

Figure 1:
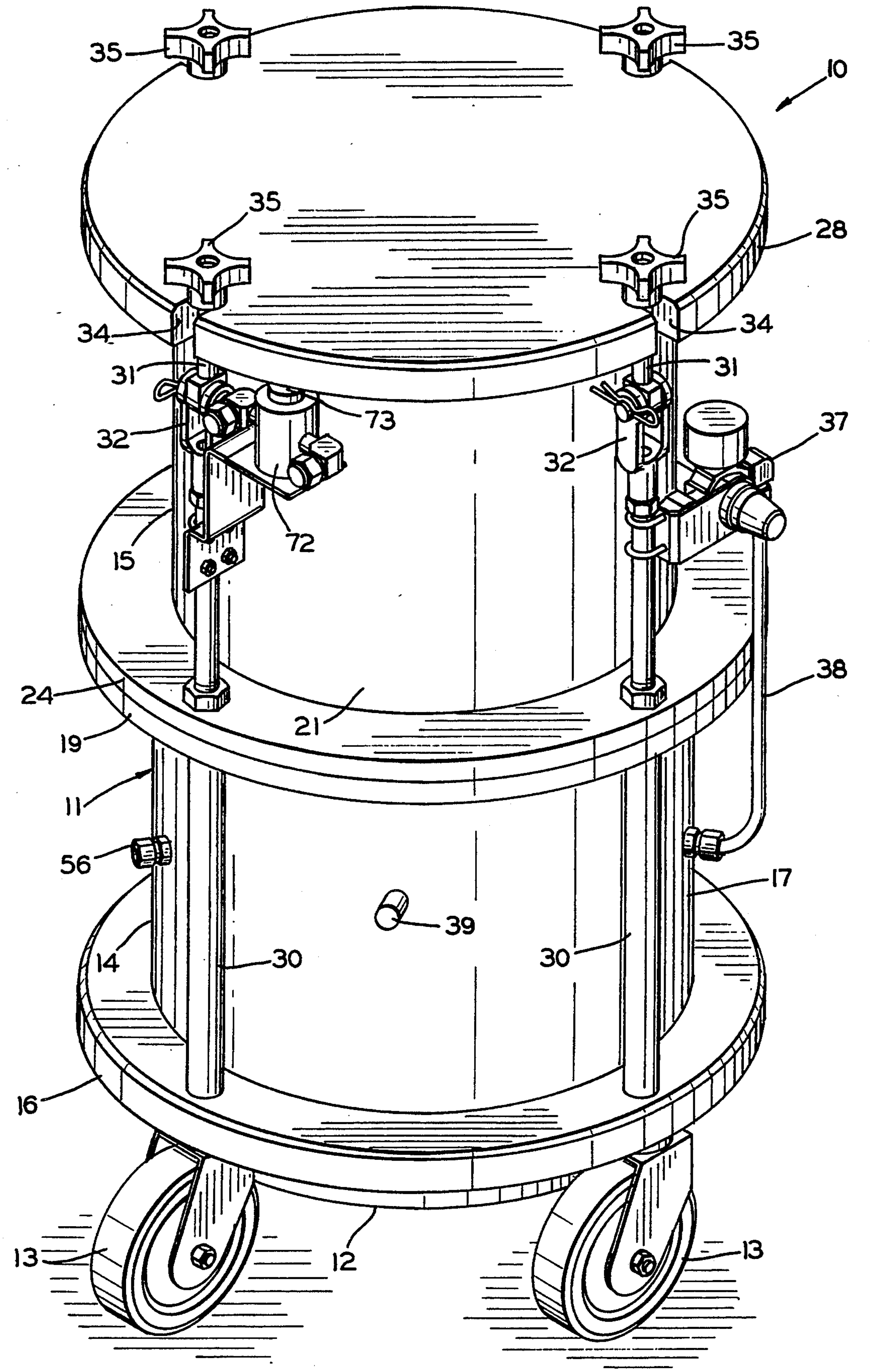
FIG. 1 is a perspective view of an electrically insulated pressure feed paint reservoir according to the invention.
Figure 2:
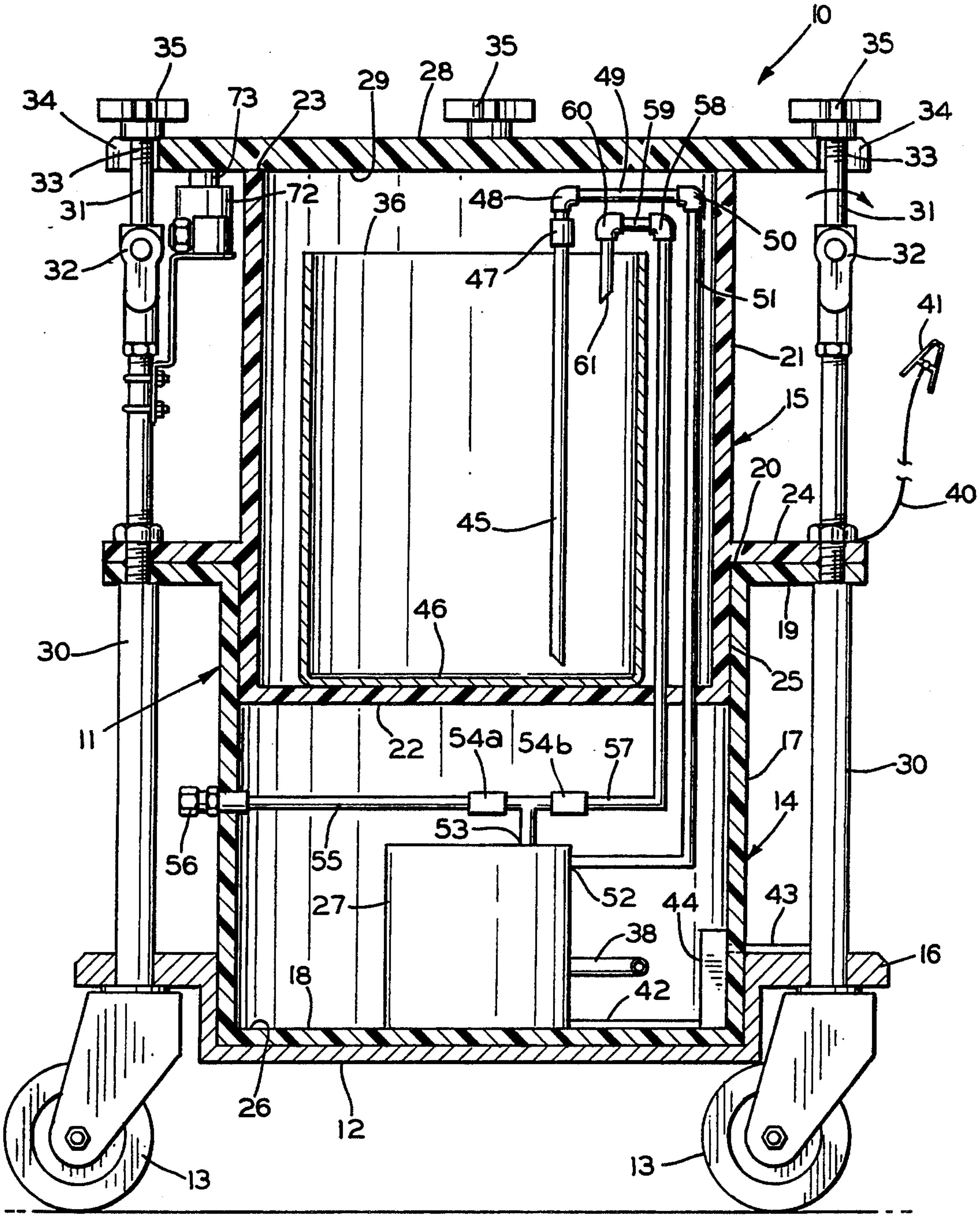
FIG. 2 is a vertical cross sectional view through the paint reservoir of FIG. 1.

Referring to FIGS. 1 and 2 of the drawings, an electrically insulated pressure feed paint reservoir 10 is illustrated according to the invention. The reservoir 10 generally includes an electrically insulated housing 11 mounted on a dolly 12. The dolly 12 has a plurality of wheels or casters 13 to provide mobility to the reservoir 10. Consequently, the reservoir does not take up a fixed floor area in a factory and may be moved into a spray booth (not shown). As best shown in FIG. 2, the housing 11 consists of a lower portion 14 which rests on the dolly 12 and an upper portion 15. Preferably, the dolly 12 has an annular flange or rim 16 which is of a larger diameter than the housing 11. The rim 16 acts as a wall bumper which protects the housing 11 from being damaged by impact with stationary objects when the reservoir 10 is moved and also increases the minimum spacing between the sides of the housing 11 and an electrically grounded wall, such as a metal wall in a spray booth.

The lower housing portion 14 has a tubular side wall 17, an integral bottom 18 and a radial flange 19 extending outwardly from an open upper end 20. The upper housing portion 15 also has a tubular side wall 21, an integral bottom 22 and an open upper end 23. A radial flange 24 extends outwardly from the side wall 21. At least the portion 25 of the side wall 21 between the flange 24 and the bottom 22 is sized to slide into the open end 20 of the lower housing 14 until the flange 24 on the upper housing portion 15 abuts the flange 19 on the lower housing portion 14. When the housing portions 14 and 15 are assembled together, a closed chamber 26 is formed in the lower housing portion 14 for mounting a paint pump 27. A lid 28 closes the open end 23 of the upper housing portion 15 to form a closed chamber 29 in the upper housing portion 15. The lower housing portion 14, the upper housing portion 15 and the lid 28 are formed with relatively thick walls of an electrically insulating material. For example, the walls may be on the order of one inch (2.54 cm) thick of high density polyethylene or of polypropylene. The material forming these walls must not only be electrically nonconductive, but they also must be immune to solvent in paint placed in the reservoir 10.

Each caster 13 is secured to a rod 30 which extends vertically from the dolly rim 16, through the flanges 19 and 24 to adjacent the lid 28. An upper rod section 31 is hinged to an upper end 32 of each rod 30. Each upper rod section 31 has a threaded end 33 which can pivot to extend through a notch 34 in the perimeter of the lid 28. After the lid 28 is positioned on the open upper end 23 of the upper housing portion 15, the rod sections 31 are pivoted into the notches 34 and a knob 35 are secured to the threaded end 33 to retain the reservoir lid 28.

The chamber 29 in the upper housing section 15 may hold the paint or it may receive a paint container 36 which holds the paint. Preferably, the chamber 29 is sized to receive a conventional paint bucket, such as a 5 U.S. gallon (19 liter) paint bucket or a standard rectangular container used in many other countries. Paint in the container 36 may be replenished simply by removing the lid 28 and either pouring additional paint into the container 36 or replacing an empty container 36 with a full container. Or, as will be described in detail below, apparatus may be provided for automatically refilling the container 36.

Although the paint pump 27 may be of various known constructions, it is preferably a pneumatically operated pump. By operating the pump with compressed air, electrical isolation problems are eliminated. If an electric pump is used, the power source for operating the pump motor must be protected from the high voltage to which the conductive paint in the pump is charged. A suitable paint pump is a double diaphragm pneumatically operated pump as described and illustrated in U.S. Pat. No. 4,496,294. Such double diaphragm pumps are compact and reliable. Preferably, the housing for the pump is made from a conductive material to prevent possible destruction due to a floating ground and the large capacitance of the conductive paint. An air line from a compressed air source (not shown) is connected through a pressure regulator valve manifold 37 and an electrically non-conducting air hose 38 to provide driving power to the pump 27. Exhaust air from the pump 27 is vented to atmosphere through a muffler 39. The muffler 39 may simply consist of a plastic fitting mounted in a hole through the side wall 17 of the lower housing portion 14 and is connected through a hose (not shown) to an exhaust port (not shown) from the pump 27. The muffler 39 has an axial opening which is filled, for example, with a piece of porous plastic. The muffler 39 is constructed from an electrically non-conductive material. By mounting the pump 27 in the chamber 26 and locating the paint supply in a chamber 29 which is isolated from the chamber 26, the paint in the container 36 is not exposed to the exhaust air and any moisture or contaminants entrained therein.

The dolly 12 and attached rods 30 are of an electrically conductive material, such as stainless steel, and are electrically connected to each other. A ground wire 40 is attached to either the dolly 12 or to one of the rods 30. The ground wire 40 has a free end terminating at a clip 41 for securing the wire 40 to any suitable grounded object, such as the metal wall or a floor grate of a spray booth (not shown). Paint and various components within the housing 11 which contact the paint will be electrically charged during spraying. Any convenient charged object in the housing 11, such as the paint pump 27, is connected through conductors 42 and 43 and a large value resistor 44 to the grounded dolly 12 or a grounded rod 30. The resistor 44 should have a sufficiently high value so as to not excessively load the high voltage power supply and a value sufficiently low so as to relatively quickly dissipate the high voltage inside the housing 11 when the high voltage power supply is turned off and the lid 28 is removed from the upper housing portion 15. The resistor 44 may be, for example, a potted resistor having a resistance on the order of 10 gigaohms.

Figure 3:
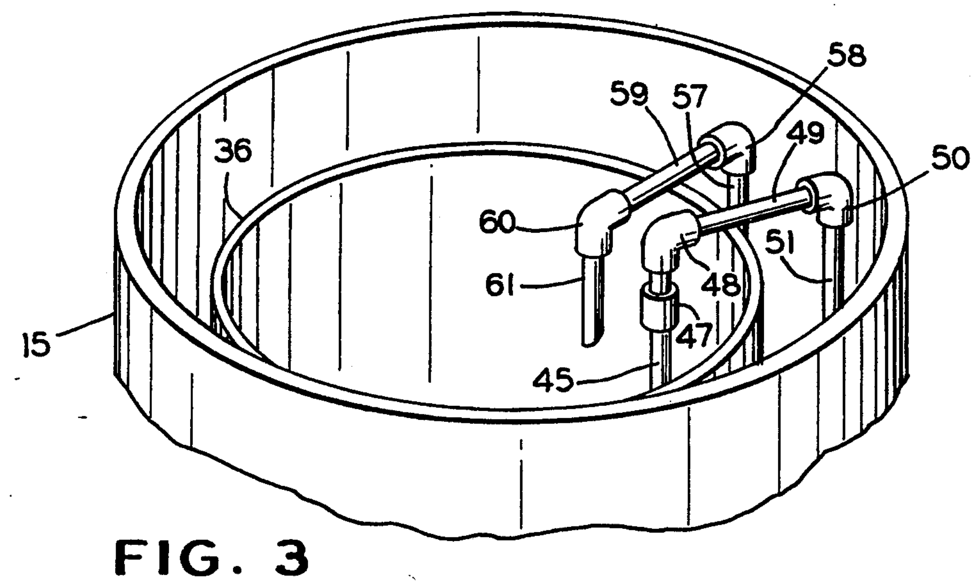
FIG. 3 is a fragmentary perspective view of the reservoir of FIG. 1 with the lid removed.
Figure 4:
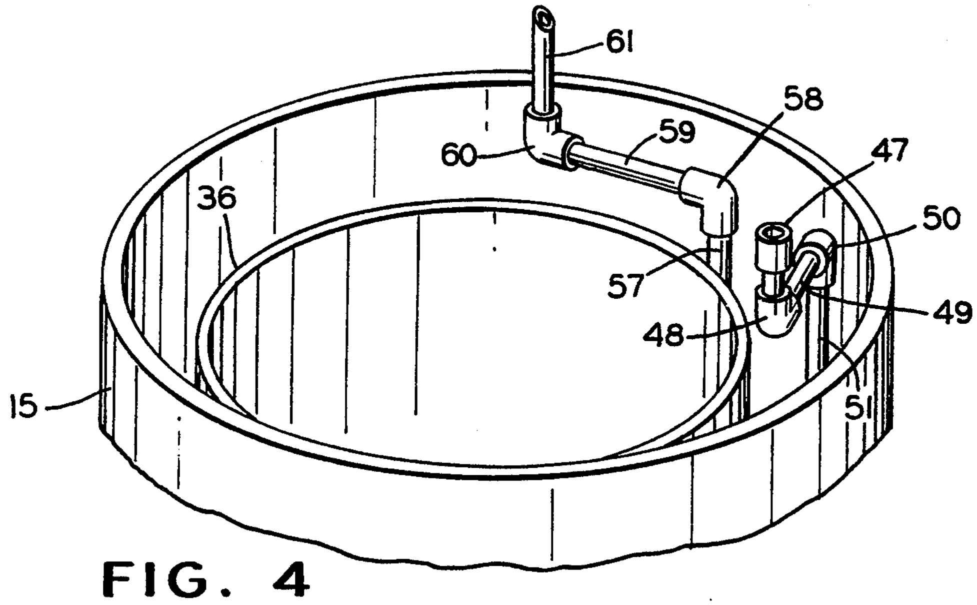
FIG. 4 is a fragmentary perspective view similar to FIG. 3, except that the paint feed tube is disconnected and the paint return tube is moved out of the way to facilitate replacing the paint bucket.

During operation of the reservoir 10, a paint feed tube 45 extends downwardly into the paint container 36 to adjacent a bottom 46 of the paint container 36. A quick disconnect fitting 47 releasably secures the feed tube 45 to a 90° elbow 48. The elbow 48 is connected through a tube 49, a second 90° elbow 50 and a tube 51 to the paint pump 27 for supplying paint to an inlet 52 of the pump 27. The elbows 48 and 50 are of a design which permits them to swivel. Consequently, the paint feed tube 45 may be disconnected at the fitting 47, the elbow 48 may be swiveled 180° so that the fitting 47 points upwardly and the elbow 50 may be swiveled to move the tube 49, the elbow 48 and the fitting 47 clear of the paint container 36 to facilitate removal and replacement of the paint container 36. With the fitting 47 directed upwardly, there is no risk of paint dripping from the fitting 47. FIG. 3 shows the upper housing portion 15 with the lid 28 removed and the paint feed tube 45 and the paint return tube 61 in their normal position. FIG. 4 shows the upper housing portion 15 with the lid 28 removed, the paint feed tube 45 removed and the paint feed fittings 47, 48 and 49 swiveled clear of the paint container 36 to facilitate removal and replacement of the container 36.

The paint pump 27 has a paint outlet 53 which may be connected through a metering valve 54*a* and a tube 55 to a quick disconnect fitting 56 mounted to extend through the side wall 17 of the lower housing portion 14. A spray gun and paint supply hose (not shown) are releasably connected to the fitting 56. The fitting 56 is non-conductive and is of the type which is closed when the hose from the gun is disconnected to prevent paint dripping. The metering valve 54*a* may be used to regulate the pressure of the paint delivered to the spray gun. A metering valve 54*b* is connected from the pump outlet 53 through a tube 57, a 90° elbow 58, a tube 59 and a 90° elbow 60 to a paint return tube 61. The elbows 58 and 60 are of the swivel type and the paint return tube 61 is sufficiently short so that the paint return tube 61 may be swiveled to point upwardly and to be clear of the paint container 36, as shown in FIG. 4. The metering valve 54*b* provides a restricted return flow path for the paint from the pump 27 when the spray gun is turned off or is consuming less than the full paint flow from the pump 27. Consequently, paint flow from the pump 27 not consumed by the gun will be recirculated back to the container 36. The paint recirculation agitates the paint in the container 36 to maintain a uniform paint suspension without causing foam in the paint. Thus, the need for a separate agitator which can foam water based paints is not required as with a pressurized paint pot. Also, it will be appreciated that by providing a return line (not shown) from the gun, excess paint may be recirculated from the gun back to the container 36. Recirculation to the gun is not practical with a pressurized paint pot.

Figure 5:
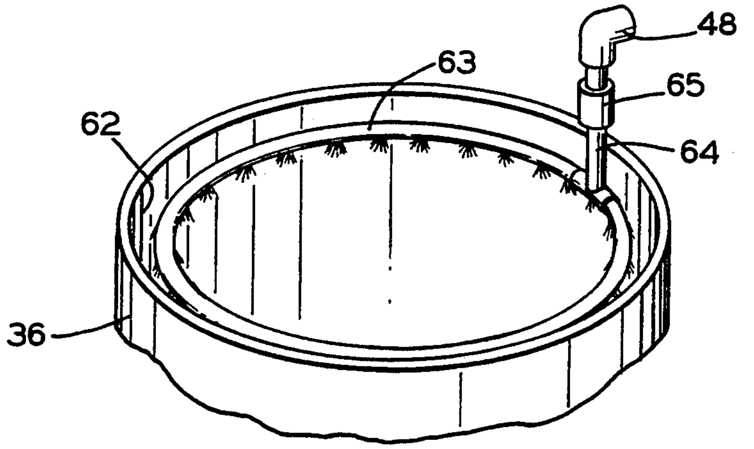
FIG. 5 is a fragmentary view of the top of a paint container showing a an annular paint return tube for directing returned paint over the interior walls of the container.

When quick drying paints are applied, there may be a tendency for the paint to dry on the sides of the paint container 36. This may be prevented by flowing the paint over an interior wall 62 of the paint container 36. FIG. 5 shows an annular paint return tube 63 which is supported by a vertical tube 64 and a quick disconnect fitting 65 from the elbow 48. The tube 63 extends around and is spaced from the inside wall 62. The tube 63 is perforated to spray a number of streams of the recirculated paint over and wet the interior container wall 62. As a consequence of the continuous flow of paint over the interior container wall 62, the paint will not dry on the interior wall 62. The quick disconnect fitting 65 facilitates removal of the tube 63 when removing and replacing the container 36.

Figure 6:
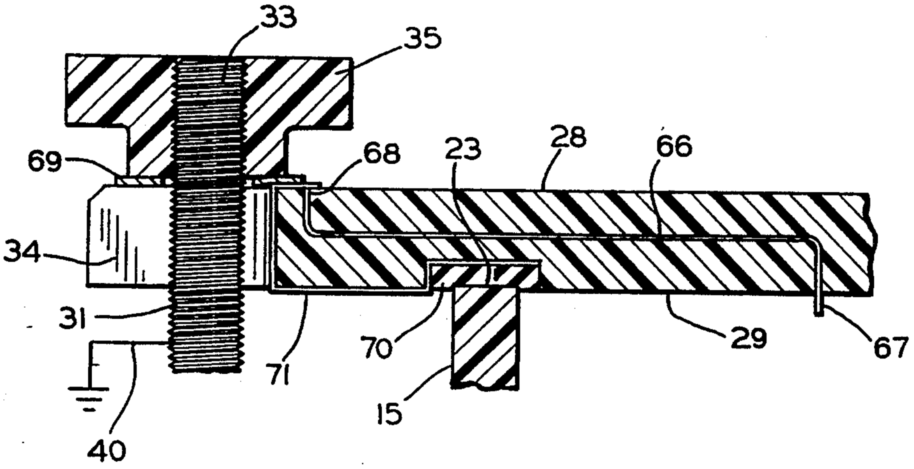
FIG. 6 is an enlarged fragmentary view of a top portion of the housing and a portion of the attached lid.

Because of the very high voltage present within the housing 11, there is a possibility of stray currents occurring between the upper housing portion 15 and the lid 28 creating a corona discharge between the lid 28 and the upper housing end 23. Such stray currents can be eliminated by providing a ground path for the currents. FIG. 6 illustrates two alternative ground paths for preventing such stray currents. As previously indicated the upper rod sections 31 are grounded along with the rods 30 and the dolly 12 through a ground wire 40. A ground path may be provided by embedding a wire 66 in the lid 28. The wire 66 has a small end 67 which projects slightly from the center of the lid 28 into the chamber 29. A second end 68 of the wire 66 extends through the lid 28 adjacent a notch 34 and is electrically connected to an adjacent grounded rod 31, for example, by a metal washer 69. Any stray currents are drawn to the wire end 67 rather than between the lid 28 and the upper housing end 23. Alternately, an electrically conductive gasket 70 can be placed between the lid 28 and the upper housing end 23. A wire 71 and the washer 69 form an electrical path from the gasket 70 to a grounded upper rod section 31. In either case, the grounded wire end 67 or the grounded gasket 70 are spaced sufficiently far from any charged object or paint in the housing 11 to prevent arcing.

Figure 7:
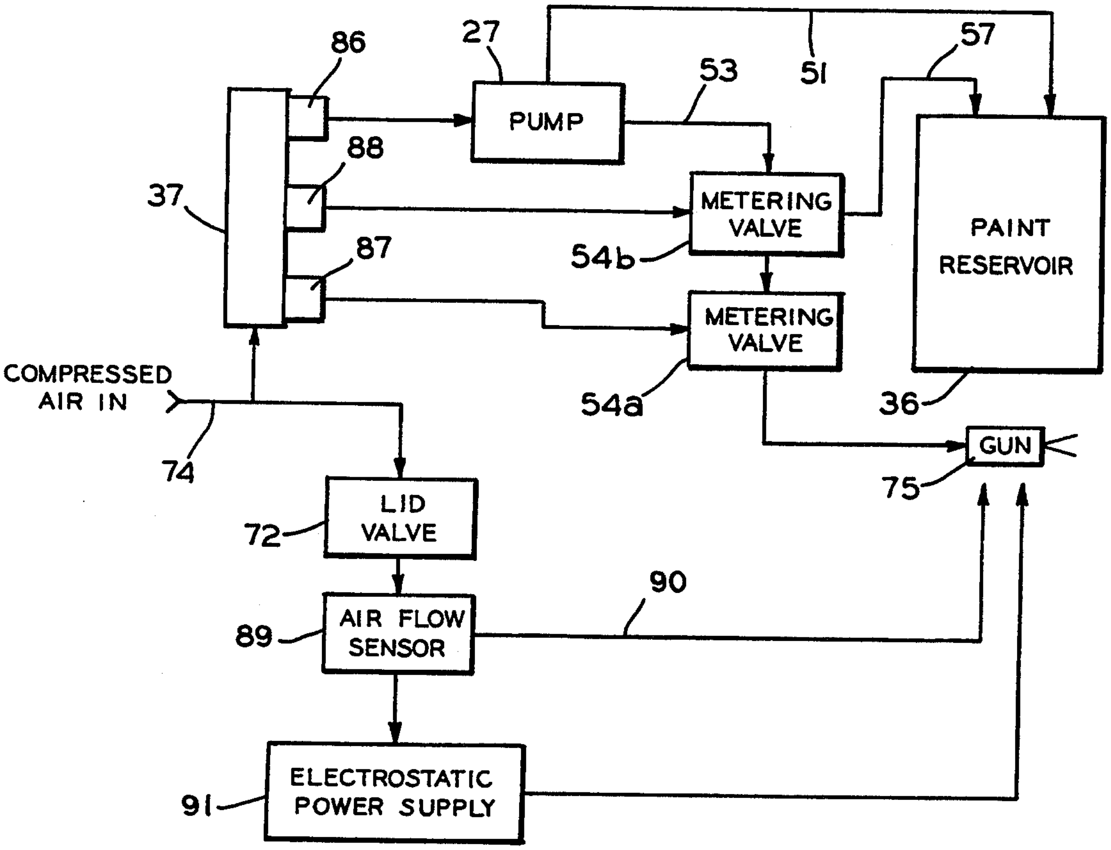
FIG. 7 is a block diagram showing the compressed air and fluid flow paths for a paint system including the reservoir of FIG. 1.

Referring again to FIGS. 1 and 2, a pneumatic valve 72 is shown mounted on a rod 30 to be positioned adjacent the lid 28. The valve 72 has a button 73 which is actuated when the lid 28 is secured to the housing 11. Removal of the lid 28 releases the valve button 73. The valve 72 is connected as a safety switch to interrupt the high voltage whenever the lid 28 is removed from the upper housing portion 15. A flow diagram for a suitable control of the insulated reservoir 10 is shown in FIG. 7. Compressed air is applied through a line 74 to the manifold 37 and to the lid valve 72. The manifold 37 is shown is mounting three air pressure regulators 86, 87 and 88. The air pressure regulator 86 regulated the air pressure applied to the pump 27 to in turn regulate the output pressure from the pump 27. The air pressure regulator 87 regulates the air pressure applied to the metering valve **54*a* to control the fluid pressure delivered to the spray gun 75. The air pressure regulator 88 regulates the air pressure applied to the metering valve 54*b* to control the recirculation of paint back to the paint container 36 or to the housing chamber 29 when no separate container 36** is used.

The outlet from the lid valve 72 is connected through an air flow sensor 89 and a hose 90 to supply operating air to the spray gun 75, for example, to assist paint atomization and/or to shape the pattern of the atomized paint as it is discharged from the spray gun 75. When the lid 28 is in place and the valve button 73 is actuated, air passes through the valve 72 flows through the hose 90 to the spray gun 75. The air flow sensor 89 switches on an electrostatic power supply 91 in response to sensing air flow and switches off the power supply 91 when the air flow is stopped. The spray gun 75 is triggered by applying compressed air to the line 74. When the spray gun is triggered, the atomization air and/or pattern shaping air flow are initiated prior to paint flow. Thus, the power supply 91 will be turned on during gun triggering, but prior to the initiation of paint flow. In the event that the lid 28 is removed from the upper housing portion 15 to expose the paint container and other components in the housing 11 which can be charged, the lid valve button 73 is released to prevent air flow to the spray gun 75. Without air flow through the sensor 89, the high voltage remains off and the resistor 44 grounds the high voltage.

Figure 8:
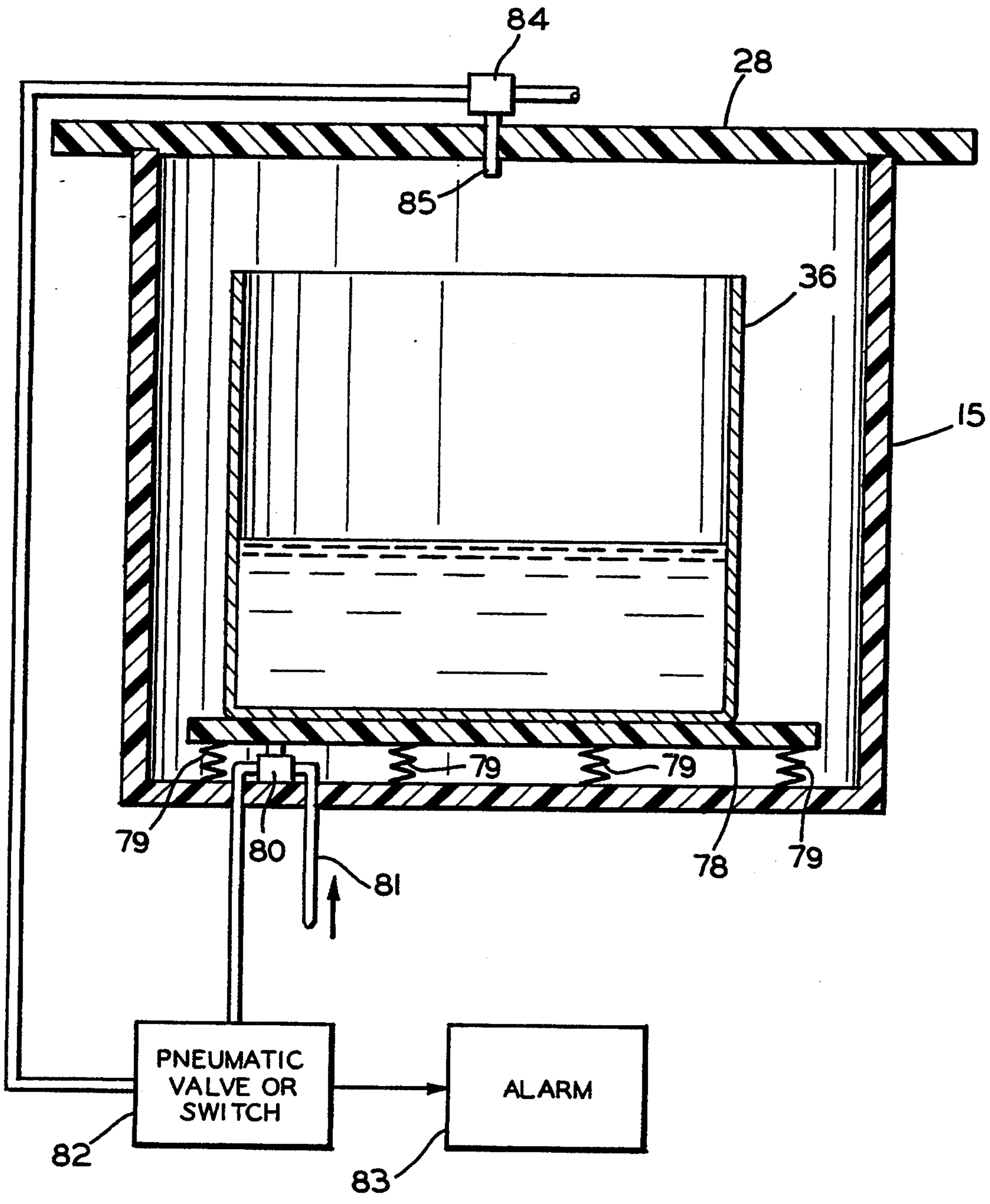
FIG. 8 is a fragmentary diagrammatic view illustrating a spring platform supporting the paint container to operate a pneumatic refill valve when the paint in the container drops to a low level.

FIG. 8 is a fragmentary diagrammatic view illustrating an automatic filler for the paint container 36. A platform 78 is mounted on springs 79 in the upper housing portion 15. Compression of the springs 79 will vary with the amount of paint in the container 36. A pneumatic valve 80 is mounted under the platform 78 for sensing when the paint container 36 is full or needs filling. When the container 36 needs filling, the position of the platform 78 operates the valve 80 and compressed air flows from a line 81 through the valve 80 to a pneumatic valve or switch 82. The valve 82 may simply operate an alarm 83 to alert the system operator that the container 36 needs filling. Or, the valve 82 may apply the compressed air to operate a pneumatic paint valve 84. The compressed air opens the valve 84 to allow paint to flow from a source (not shown) through a tube 85 which is mounted in the lid 28 to refill the container 36. When the container 36 is full, the valve 84 is closed and painting in resumed. Unless the paint supply connected to the tube 84 is isolated from ground, the pneumatic switch 82 also is connected to turn off the electrostatic voltage power supply 77. If desired, the pneumatic valve 82 also may be connected to interrupt air flow to the paint pump 27 while the paint supply is automatically replenished.

Figure 9:
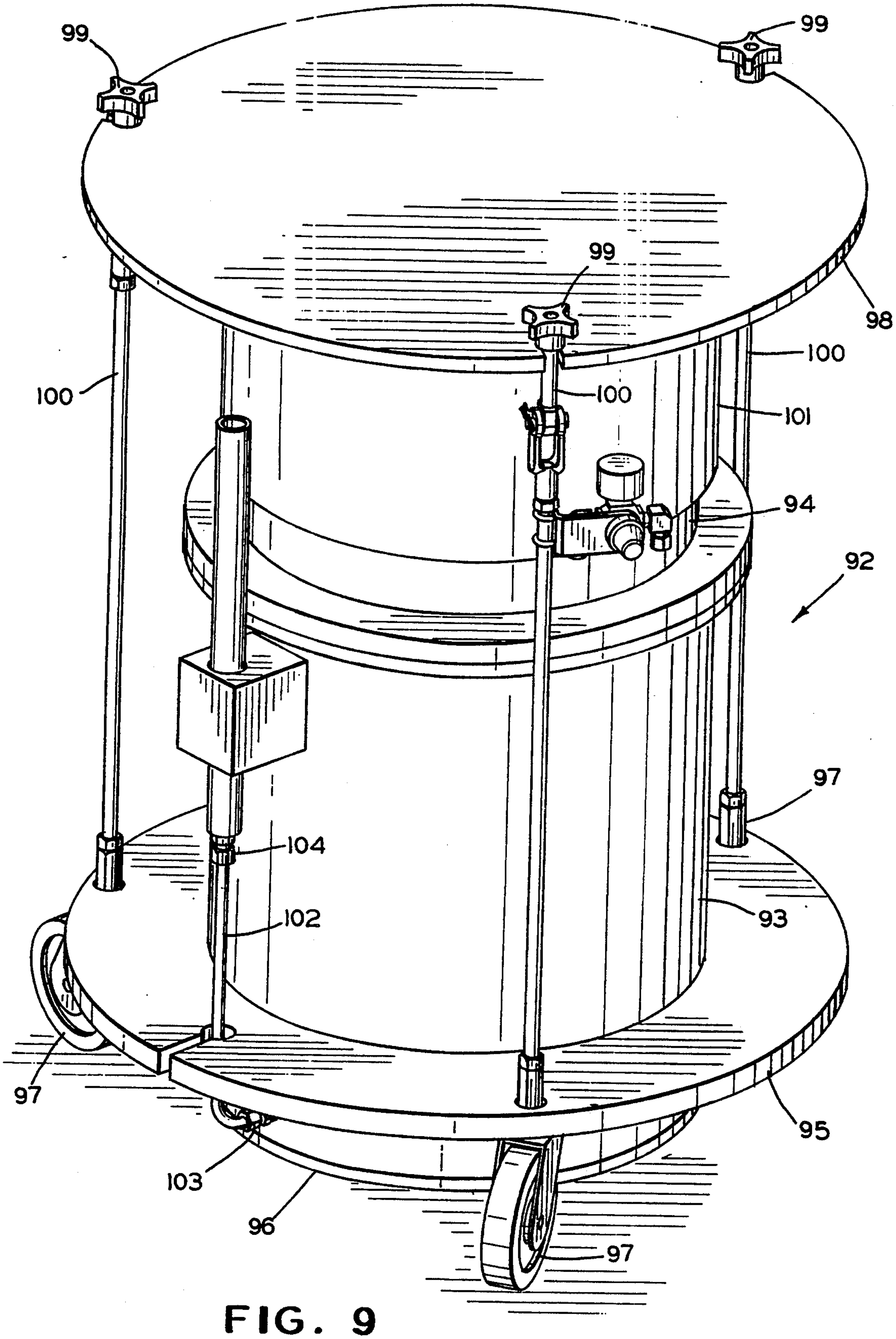
FIG. 9 is a perspective view of an electrically insulated pressure feed paint reservoir according to a modified embodiment of the invention.
Figure 10:
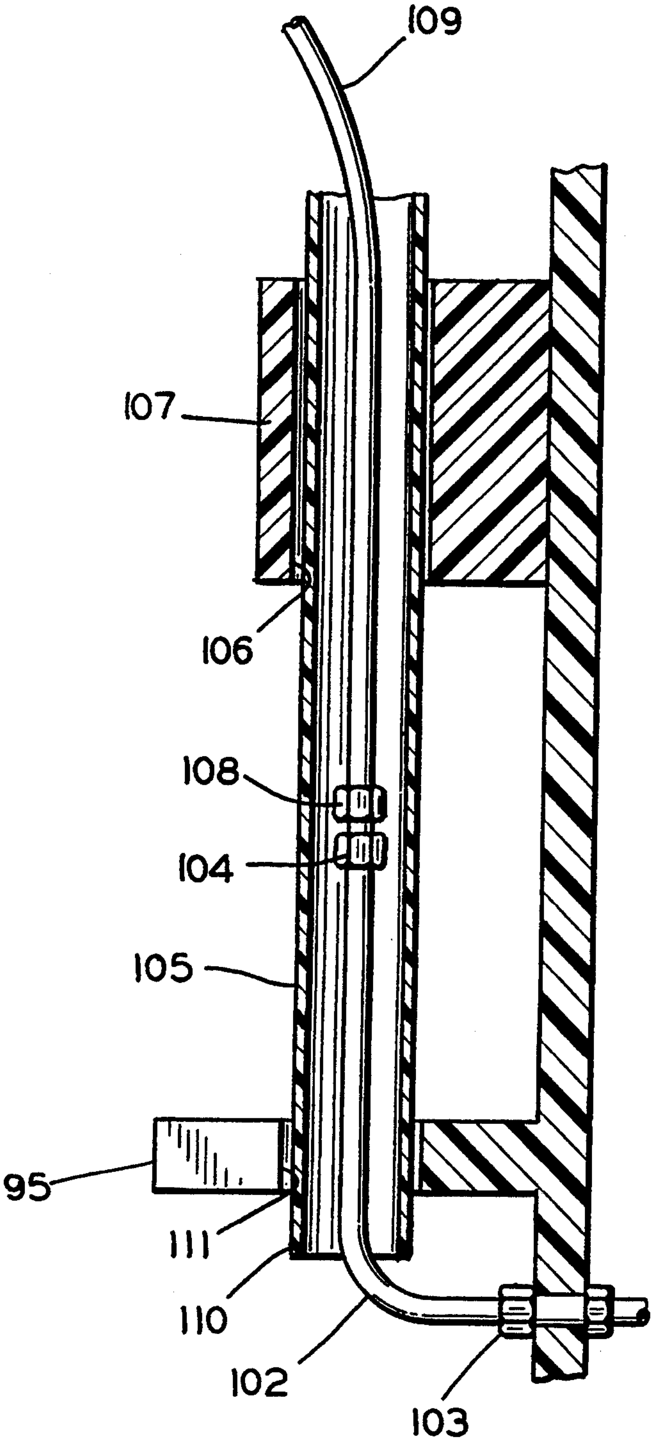
FIG. 10 is an enlarged cross sectional view showing details of the paint supply line connection for the reservoir of FIG. 9.

FIGS. 9 and 10 illustrate a modified embodiment of an electrically insulated reservoir 92 for delivering paint or other liquid to a spray gun. The reservoir includes a lower housing 93 which functions similar to the lower housing portion 14 for holding a liquid pump (not shown) and an upper housing 94 which functions similar to the upper housing portion 15 for holding liquid or a liquid container (not shown). An enlarged diameter radial flange 95 is integrally formed with the lower housing 93 to extend from the lower housing 93 a short distance above a lower housing bottom 96. At least three casters 97 are secured to the flange 95 to facilitate moving the reservoir 92. The upper housing 94 is closed by a lid 98 which is secured in place by knobs 99 threaded onto rods 100. A tubular sleeve 101 is integral with the lid 98 for extending downwardly over a portion of the upper housing 94. The sleeve 101 increases the electrical path between charged components within the upper housing 94 and the nearest electrical ground exterior to the upper housing 94. An insulated paint delivery tube 102 passes through an insulated fitting 103 through the lower housing 93 and is bent to extend parallel to the lower housing 93. The paint tube 102 terminates at a quick disconnect fitting 104. As shown in detail in FIG. 10, an electrically insulated tube 105 is positioned to slide up and down in an opening 106 in a block 107 secured to the side of the lower housing 93. The block opening 106 is axially aligned with the paint tube 102 so as to slide down over the quick disconnect fitting 104, as shown in FIG. 10 and to slide upwardly to be clear of the quick disconnect fitting 104, as shown in FIG. 9. This construction permits the use of metal quick disconnect fittings for the fitting 104 and for a fitting 108 on an end of a hose 109 connected to supply paint to the spray gun without the risk of arcing. When the tube 105 is lowered to cover the fittings 104 and 108, a lower end 110 of the tube 105 extends through an opening 111 in the flange 95 to provide stability to the tube 105.

The illustrated preferred embodiments of the insulated reservoirs 10 and 92 have two separate housing portions. Alternately, the housing may be constructed having a single chamber. Preferably, the paint pump is mounted in the bottom of the chamber and a removable platform is provided for supporting the paint bucket above the pump. This arrangement provides easy access to the paint bucket. It will be appreciated that various other modifications and changes may be made to the above described preferred embodiment of an electrically isolating paint reservoir for electrically conductive paints applied with an electrostatic applicator without departing from the spirit and the scope of the following claims.

We claim:

1. A pressure feed paint reservoir suitable for holding electrically conductive paint which is charged while applying with an electrostatic spray gun comprising an electrically non conducting housing having an open top, an electrically non-conducting lid, means for removably securing said lid to said housing to close said open top, said housing and said lid defining an electrically insulated closed chamber for receiving paint, a pneumatically operated paint pump mounted in said housing, said pump having a paint inlet and a paint outlet, means for delivering paint from a paint container in said chamber to said pump inlet, means for delivering paint under pressure from said pump outlet to a spray gun, and means for preventing stray current leakage between said lid and said housing comprising an electrically conductive wire embedded in said lid, said wire having a first and second ends, said first wire end projecting through said lid into said chamber, and means for electrically grounding said wire.

2. A pressure feed paint reservoir suitable for holding electrically conductive paint which is charged while applying with an electrostatic spray gun comprising an electrically non conducting housing having an open top, an electrically non-conducting lid, means for removably securing said lid to said housing to close said open top, said housing and said lid defining an electrically insulated closed chamber for receiving paint, a pneumatically operated paint pump mounted in said housing, said pump having a paint inlet and a paint outlet, means for delivering paint from a paint container in said chamber to said pump inlet, means for delivering paint under pressure from said pump outlet to a spray gun, and means for preventing stray current leakage between said lid and said housing comprising an electrically conductive gasket positioned between said lid and said housing, and means for electrically grounding said gasket.

3. A portable pressure feed paint reservoir suitable for holding electrically conductive paint which is charged while applying with an electrostatic spray gun comprising an electrically non conducting housing having an open top, wheel means supporting said housing for mobility, an electrically non-conducting lid, means for removably securing said lid to said housing to close said open top, said housing and said lid defining an electrically insulated closed chamber for receiving a paint container, a pneumatically operated paint pump mounted in said housing, said pump having a paint inlet and a paint outlet, means for delivering paint from a paint container in said chamber to said pump inlet, means for delivering paint under pressure from said pump outlet to a spray gun, valve means mounted in said housing for recirculating paint from said pump outlet to the paint receiving chamber, and wherein said housing has an upper chamber closed by said lid and a closed lower chamber, and wherein said upper chamber receives said paint container and said pump is mounted in said lower chamber, annular tube means mounted in said paint container adjacent a top of said container, and wherein said means for recirculating paint delivers paint to said annular tube means, said annular tube means discharging recirculated paint over an interior wall of said container to maintain such interior wall wetted with paint.

4. A pressure feed paint reservoir suitable for holding electrically conductive paint which is charged while applying with an electrostatic spray gun comprising an electrically non conducting housing having an open top, an electrically non-conducting lid, means for removably securing said lid to said housing to close said open top, said housing and said lid defining an electrically insulated closed chamber for receiving paint, a pneumatically operated paint pump mounted in said housing, said pump having a paint inlet and a paint outlet, means for delivering paint from a paint container in said chamber to said pump inlet, means for delivering paint under pressure from said pump outlet to a spray gun, a paint container in said paint receiving chamber, tube means for delivering paint from said paint container to said pump inlet, said tube means including a support tube extending over an open top of the paint container, a paint feed tube, a quick disconnect fitting attaching said paint feed tube to said support tube, said support tube including swivel joint means to permit said quick disconnect fitting to be rotated to an upwardly directed position and to permit said support tube to be swiveled away from the paint container top.

* * * * *